(12) United States Patent
Wierstra et al.

(10) Patent No.: US 10,776,670 B2
(45) Date of Patent: Sep. 15, 2020

(54) IMAGINATION-BASED AGENT NEURAL NETWORKS

(71) Applicant: DeepMind Technologies Limited, London (GB)

(72) Inventors: Daniel Pieter Wierstra, London (GB); Yujia Li, London (GB); Razvan Pascanu, Letchworth Garden (GB); Peter William Battaglia, London (GB); Theophane Guillaume Weber, London (GB); Lars Buesing, London (GB); David Paul Reichert, London (GB); Arthur Clement Guez, London (GB); Danilo Jimenez Rezende, London (GB); Adrià Puigdomènech Badia, London (GB); Oriol Vinyals, London (GB); Nicolas Manfred Otto Heess, London (GB); Sebastien Henri Andre Racaniere, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/689,058

(22) Filed: Nov. 19, 2019

(65) Prior Publication Data

US 2020/0090006 A1 Mar. 19, 2020

Related U.S. Application Data

(63) Continuation of application No. PCT/EP2018/063283, filed on May 22, 2018.
(Continued)

(51) Int. Cl.
*G06K 9/00* (2006.01)
*G06K 9/62* (2006.01)
(Continued)

(52) U.S. Cl.
CPC ......... *G06K 9/6264* (2013.01); *G06K 9/6218* (2013.01); *G06K 9/6807* (2013.01); *G06N 3/0454* (2013.01); *G06N 3/08* (2013.01)

(58) Field of Classification Search
CPC combination set(s) only.
See application file for complete search history.

(56) References Cited

U.S. PATENT DOCUMENTS

2011/0222724 A1* 9/2011 Yang ................. G06K 9/00248
382/103
2015/0356461 A1 12/2015 Vinyals et al.
(Continued)

OTHER PUBLICATIONS

Abbeel et al., "Exploration and apprenticeship learning in reinforcement learning," Proceedings of the 22nd international conference on Machine learning, Aug. 2005, 8 pages.
(Continued)

*Primary Examiner* — Alex Kok S Liew
(74) *Attorney, Agent, or Firm* — Fish & Richardson P.C.

(57) ABSTRACT

A neural network system is proposed. The neural network can be trained by model-based reinforcement learning to select actions to be performed by an agent interacting with an environment, to perform a task in an attempt to achieve a specified result. The system may comprise at least one imagination core which receives a current observation characterizing a current state of the environment, and optionally historical observations, and which includes a model of the environment. The imagination core may be configured to output trajectory data in response to the current observation, and/or historical observations. The trajectory data comprising a sequence of future features of the environment imagined by the imagination core. The system may also include a rollout encoder to encode the features, and an output stage to receive data derived from the rollout embedding and to
(Continued)

output action policy data for identifying an action based on the current observation.

17 Claims, 4 Drawing Sheets

Related U.S. Application Data

(60) Provisional application No. 62/509,023, filed on May 19, 2017.

(51) Int. Cl.
    *G06K 9/68*     (2006.01)
    *G06N 3/04*     (2006.01)
    *G06N 3/08*     (2006.01)

(56) References Cited

U.S. PATENT DOCUMENTS

2017/0161607 A1* 6/2017 English ............... G06F 3/017
2018/0086336 A1* 3/2018 Jones ................. B60W 10/04

OTHER PUBLICATIONS

Baird, "Advantage updating," Technical Report WL-TR-93/1146., 1993, 48 pages.
Bansal et al., "Goal-driven dynamics learning via bayesian optimization," arXiv:1703.09260, Mar. 2017, 9 pages.
Bengio et al., "Scheduled sampling for sequence prediction with recurrent neural networks," Advances in Neural Information Processing Systems, 2015, 1171-1179.
Chiappa et al., "Recurrent environment simulators," arXiv:1704.02254, Apr. 2017, 61 pages.
Childs et al., "Transpositions and move groups in monte carlo tree search," Computational Intelligence and Games, IEEE Symposium, Dec. 2008, 389-395.
Christiano et al., "Transfer from simulation to real world through learning deep inverse dynamics model," arXiv:1610.03518, Oct. 2016, 8 pages.
Coulom et al., "Efficient selectivity and backup operators in monte-carlo tree search," International Conference on Computers and Games, Nov. 2006, 72-83.
Cutler et al., "Real-world reinforcement learning via multifidelity simulators" IEEE Transactions on Robotics, May 2015, 31(3):655-671.
Deisenroth et al., "Pilco: A model-based and data-efficient approach to policy search," Proceedings of the 28th International Conference on machine learning, 2011, 465-472.
Finn et al., "Deep visual foresight for planning robot motion," IEEE International Conference on Robotics and Automation, May 2017, 8 pages.
Gelly et al., "Combining online and offline knowledge in uct," Proceedings of the 24th International Conference on Machine Learning, Jun. 2007, 273-280.
Graves, "Adaptive computation time for recurrent neural networks," arXiv:1603.08983, Mar. 2016, 19 pages.
Gu et al., "Continuous deep q-learning with model-based acceleration," International Conference on Machine Learning, Mar. 2016, 2829-2838.
Hamrick et al., "Metacontrol for adaptive imagination-based optimization," Proceedings of the 5th International Conference on Learning Representations, May 2017, 21 pages.
Hassabis et al., "Patients with hippocampal amnesia cannot imagine new experiences," Proceedings of the National Academy of Sciences, Jan. 2007, 104(5):1726-1731.
Hassabis et al., "Using imagination to understand the neural basis of episodic memory" Journal of Neuroscience, Dec. 2007, 27(52):14365-14374.
Henaff et al., "Model-based planning in discrete and continuous actions," arXiv:1705.07177, May 2017, 11 pages.
Jaderberg et al., "Reinforcement learning with unsupervised auxiliary tasks," arXiv:1611.05397, Nov. 2016, 14 pages.
Kansky et al., "Schema networks: Zero-shot transfer with a generative causal model of intuitive physics," Accepted at International Conference for Machine Learning, Jun. 2017, 10 pages.
Kocsis et al., "Bandit based monte-carlo planning," European conference on machine learning, Sep. 2006, 282-293.
Lake et al., "Building machines that learn and think like people," arXiv:1604.00289, Apr. 2016, 58 pages.
Legg et al., "Universal intelligence: A definition of machine intelligence," Minds and Machines, Dec. 2007, 17(4):391-444.
Leibfried et al., "A deep learning approach for joint video frame and reward prediction in atari games," CoRR, abs/1611.07078, Nov. 2016, 18 pages.
Lenz et al., "DeepMPC: Learning deep latent features for model predictive control," Robotics: Science and Systems, Jul. 2015, 9 pages.
Levine et al., "Learning neural network policies with guided policy search under unknown dynamics," Advances in Neural Information Processing Systems, 2014, 1071-1079.
Lillicrap et al., "Continuous control with deep reinforcement learning," arxiv:1509.02971v6, Jul. 2019, 14 pages.
Liu et al., "Imitation from observation: Learning to imitate behaviors from raw video via context translation," arXiv:1707.03374, Jul. 2017, 8 pages.
Marco et al., Virtual vs. real: Trading off simulations and physical experiments in reinforcement learning with bayesian optimization, arXiv:1703.01250, Mar. 2017, 7 pages.
Mirowski et al., "Learning to navigate in complex environments," arXiv:1611.03673, Jan. 2017, 16 page.
Mnih et al., "Asynchronous methods for deep reinforcement learning," International Conference on Machine Learning, Feb. 2016, 1928-1937.
Mnih et al., "Playing atari with deep reinforcement learning," arXiv:1312.5602, Dec. 2013, 9 pages.
Murase et al., "Automatic making of sokoban problems," PRICAI'96: Topics in Artificial Intelligence, Aug. 1996, 592-600.
Oh et al., "Action-conditional video prediction using deep networks in atari games," Advances in Neural Information Processing Systems, 2015, 2863-2871.
Oh et al., "Value prediction network," arXiv:1707.03497, Jul. 2017, 16 pages.
Pascanu et al., "Learning model-based planning from scratch," arXiv:1707.06170, Jul. 2017, 13 pages.
PCT International Preliminary Report on Patentability in International Application No. PCT/EP2018/063283, dated Nov. 28, 2019, 12 pages.
PCT International Search Report and Written Opinion in International Application No. PCT/EP2018/063283, dated Oct. 2, 2018, 19 pages.
Peng et al., "Efficient learning and planning within the dyna framework," Adaptive Behavior, Mar. 1993, 1(4):437-454.
Pfeiffer et al., "Hippocampal place-cell sequences depict future paths to remembered goals," Nature, May 2013, 497(7447):74-79.
Rosin et al., "Nested rollout policy adaptation for monte carlo tree search," IJCAI, Jun. 2011, 649-654.
Schacter et al., "The future of memory: remembering, imagining, and the brain," Neuron, Nov. 2012, 76(4):677-694.
Schmidhuber, "An on-line algorithm for dynamic reinforcement learning and planning in reactive environments," IJCNN International Joint Conference on Neural Networks, Jun. 1990, 253-258.
Schmidhuber, "On learning to think. Algorithmic information theory for novel combinations of reinforcement learning controllers and recurrent neural world models," arXiv:1511.09249, Nov. 2015, 36 pages.
Schulman et al., "Trust region policy optimization," Proceedings of the 32nd International Conference on Machine Learning, Feb. 2015, 1889-1897.

(56) References Cited

OTHER PUBLICATIONS

Schulman et al., "Gradient estimation using stochastic computation graphs," Advances in Neural Information Processing Systems, Jun. 2015, 3528-3536.

Silver et al., "The predictron: End-to-end learning and planning," arXiv:1612.08810, Dec. 2016, 12 pages.

Silver et al., "Mastering the game of go with deep neural networks and tree search" Nature, Jan. 2016, 529(7587):484-489.

Sutton et al., "Integrated architectures for learning, planning, and reacting based on approximating dynamic programming," Proceedings of the seventh international conference on machine learning, Jan. 1990, 216-224.

Talvitie, "Agnostic system identification for monte carlo planning," AAAI, Feb. 2015, 2986-2992.

Talvitie, "Model regularization for stable sample rollouts," UAI, Jul. 2014, 780-789.

Tamar et al., "Value iteration networks," Advances in Neural Information Processing Systems, Feb. 2016, 2154-2162.

Taylor et al., "Procedural generation of sokoban levels," Proceedings of the International North American Conference on Intelligent Games and Simulation, Feb. 2011, 5-12.

Taylor et al., "Transfer learning for reinforcement learning domains: A survey," Journal of Machine Learning Research, Jul. 2009, 10(2009):1633-1685.

Tesauro et al, "On-line policy improvement using monte-carlo search" NIPS, 1996, 96:1068-1074.

Tolman, Cognitive maps in rats and men. Psychological Review, Jul. 1948, 55(4):189.

Tzeng et al., "Towards adapting deep visuomotor representations from simulated to real environments," arXiv:1511.07111, May 2017, 16 pages.

Venkatraman et al., "Improved learning of dynamics models for control," International Symposium on Experimental Robotics, Oct. 2016, 703-713.

Watter et al., "Embed to control: A locally linear latent dynamics model for control from raw images," Advances in Neural Information Processing Systems, Jun. 2015, 2746-2754.

* cited by examiner

IMAGINATION-BASED AGENT NEURAL NETWORKS

CROSS REFERENCE TO RELATED APPLICATIONS

This application is a continuation of and claims priority to PCT Application No. PCT/EP2018/063283, filed on May 22, 2018, which claims priority to U.S. Provisional Application No. 62/509,023, filed on May 19, 2017. The disclosures of the prior applications are considered part of and are incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a reinforcement learning system that selects actions to be performed by a reinforcement learning agent interacting with an environment. In order for the agent to interact with the environment, the system receives data characterizing the current state of the environment and selects an action to be performed by the agent in response to the received data. Data characterizing a state of the environment will be referred to in this specification as an observation.

In some implementations, the environment is a simulated environment and the agent is implemented as one or more computer programs interacting with the simulated environment. For example, the simulated environment may be a video game and the agent may be a simulated user playing the video game. As another example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle. More generally the environment may be one in which a robotic control task is performed.

Thus in some other implementations, the environment is a real-world environment and the agent is a mechanical agent interacting with the real-world environment. For example, the agent may be a robot interacting with the environment to accomplish a specific task. As another example, the agent may be an autonomous or semi-autonomous vehicle navigating through the environment. In these implementations, the actions may be control inputs to control the robot or the autonomous vehicle.

In one aspect of the present disclosure a neural network system for model-based reinforcement learning is used to select actions to be performed by an agent interacting with an environment, to perform a task in an attempt to achieve a specified result. The system may comprise at least one imagination core which has an input to receive a current observation characterizing a current state of the environment, and optionally historical observations, and which includes a model of the environment. The imagination core may be configured to output trajectory data in response to the current observation, and/or historical observations, the trajectory data defining a trajectory comprising a sequence of future features of the environment imagined by the imagination core (that is, predicted on the assumption that the agent performs certain actions). The system may also include at least one rollout encoder to encode the sequence of features from the imagination core to provide a rollout embedding for the trajectory. The system may further comprise a reinforcement learning output stage to receive data derived from the rollout embedding and to output action policy data for defining an action policy identifying an action based on the current observation.

The reinforcement learning (RL) output stage may be any type of RL output stage. For example it may be policy-based, for example to directly search for an optimum policy and output policy data, and optionally baseline state-value data; or it may be value based, for example outputting Q-value data. In some implementations the reinforcement learning output stage comprises an actor-critic RL output stage. The policy data may comprise a policy vector defining the action policy and value baseline data for the current observation, for determining an advantage of an action defined by the action policy. In general the action policy data may use the imagined trajectory as context.

Typically the neural network system is used to produce multiple trajectories for each observation of the current state of the environment (current observation). For this, the neural network system may include multiple imagination cores. The rollout encoder, or a set of rollout encoders, may then encode the sequence of features from each trajectory, to provide a rollout embedding for each respective trajectory. The system may then further comprise an aggregator to aggregate the rollout embeddings into an imagination code for the reinforcement learning output stage. The action policy data is then dependent upon the imagination code, using the imagination as context.

In some implementations the imagination core comprises a neural environment model coupled to a policy module. The neural environment model receives the current observation and/or a history of observations, and also a current action, and predicts a subsequent observation in response. It may also predict a reward from taking the action. The policy module defines a policy to rollout a sequence of actions and states using the environment model, defining a trajectory. The trajectory may be defined by one or more of predicted observations, predicted actions, predicted rewards, and a predicted sequence termination signal. The neural environment model may predict a subsequent observation in response to a current observation and a history of observations, conditioned on action data from the policy module.

The rollout encoder may comprise a sequential state generation neural network such as an LSTM (Long Short Term Memory) network. The aggregator may concatenate the rollout embeddings.

In implementations the neural environment model is a learned model of the environment. Thus a method of training the system may involve pre-training one or more such models for the imagination cores and then training other adaptive components of the system using reinforcement learning. The learned models may be imperfect models of the environment and may be trained on the same or a different environment to the environment in which the RL system operates.

The policy module (rollout policy) for the imagination core(s) may be random or according to a model-free policy, for example defined by a neural network. Alternatively, the policy module may be distilled (i.e. derived) from the imagination-augmented action policy of the reinforcement learning output stage, for example by training it using a cost function which is a function of a difference between the policy defined by the policy module and the imagination-augmented policy defined by the reinforcement learning stage, e.g. their outputs in response to the current observation.

In some implementations the system includes a model-free reinforcement learning neural network module coupled between the input and the reinforcement learning output stage, for example an actor-critic RL module. This facilitates the system falling back on a policy generated using an output of the model-free reinforcement learning neural network module, should the learned models fail, or be determined to be untrustworthy, e.g. by the rollout encoder.

The subject matter described in this specification can be implemented in particular embodiments so as to realize one or more of the following advantages. The system can learn effectively in environments with complex tasks and reward functions. It can handle learned, and thus potentially imperfect models of the environment, even models which entirely lack reward prediction. The system can learn to tolerate inaccuracies, for example falling back on a model-free policy; it is tolerant to mismatches between the model and the environment. However the system can out-perform purely model-free approaches.

Experimentally, it was found that in challenging problems the system was able to perform better than model-free baselines. It achieved this better performance with less training data. Due to the reduced amount of training data, a saving may be achieved in memory requirements. Furthermore, the described systems may also require reduced computing resources to achieve a given level of performance, since this may be achieved with less training than with previous techniques.

The experiments also demonstrated a high ability to generalize, based on learning a first task, to perform different, though related, tasks. Thus, the system may operate with high reliability, since its performance may not be significantly degraded even if the training data is not statistically representative of an actual control task which the trained system has to perform.

The experiments included navigation tasks, indicating the suitability of the system for controlling navigation, such as controlling an autonomous or semi-autonomous vehicle navigating through the environment. The experiments were based on pixelated data from simulated environments, indicating that the system may be successful for receiving state data in the form of real-world image data captured by cameras.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a reinforcement learning system implemented as computer programs on one or more computers in one or more locations that selects actions to be performed by a reinforcement learning agent interacting with an environment by using a neural network. This specification also describes how such a system can adjust the parameters of the neural network.

The system has an advantage that an agent such as a robot, or autonomous or semi-autonomous vehicle can improve its interaction with a simulated or real-world environment. It can enable for example the accomplishment of a specific task or improvement of navigation through or interaction with the environment. This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

In order to interact with the environment, the agent receives data characterizing the current state of the environment and performs an action from an action space, i.e., a discrete action space or continuous action space, in response to the received data. Data characterizing a state of the environment will be referred to in this specification as an observation.

In some implementations the environment is a simulated environment and the agent is implemented as one or more computers interacting with the simulated environment. For example the simulated environment may be a video game and the agent may be a simulated user playing the video game.

In other implementations the environment is a real-world environment and the agent is a mechanical agent interacting with the real-world environment. For example, the agent may be a robot interacting with the environment to accomplish a specific task or an autonomous or semi-autonomous vehicle navigating through the environment. In these cases the observation can be data captured by one or more sensors of the agent as it interacts with the environment, e.g., a camera, a LIDAR sensor, a temperature sensor, and so forth.

Figure 1:
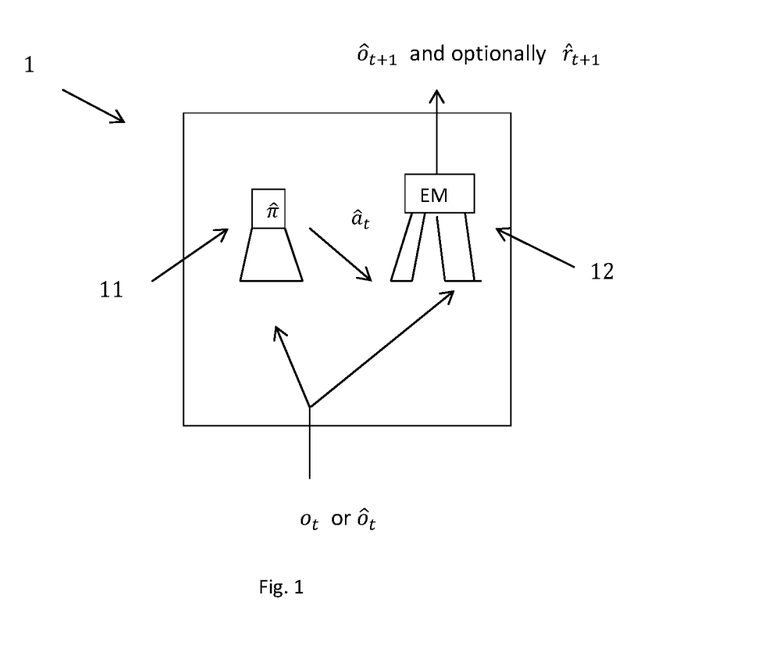
FIG. 1 shows an imagination core for a neural network system.

FIG. 1 shows an imagination core (IC) 1 proposed by the present disclosure, which is a component of a neural network system (illustrated in FIG. 3) for controlling the agent. The IC 1 includes a policy module 11 and a neural environment model 12, that is a model which, given information at a time t, is able to make a prediction about at least one later time. As described below, the environment model 12 is used in the neural network to make a prediction about multiple times after time t (discretized as time steps). This is referred to as a rollout. It represents an imagined trajectory of the environment at times after time t, assuming that the agent performs certain actions. The results are interpreted by a neural network (encoder), and used as additional content for a policy module of the neural network system which generates data representing a policy for the agent.

In FIG. 1 an observation of the environment at any time t is denoted by "$o_t$", while an action at any time t is denoted by "$a_t$", and a reward at any time t is denoted by "$r_t$". The symbol ^ in relation to an observation, an action or a reward, is used in all of FIGS. 1-3 to denote that the corresponding quantity is an output of the imagination core, and is thus associated with an imagination rollout.

The input to the IC 1 may be an actual observation $o_t$ (i.e. one obtained from the environment at time t), or an imagined observation $ô_t$. It is transmitted to both the policy module 11 and the environment module 12.

From it, the policy module 11 generates an action $â_t$. The policy module 11 may be generated in several ways. Firstly, it may simply be random. Alternatively, it may be pre-trained. Below, with reference to FIG. 5, we discuss how, in an alternative, it can be an adaptive model trained jointly with other adaptive components of the neural network.

The environment model 12 can be any recurrent architecture which can be trained in an unsupervised fashion from agent trajectories: given a past state and a corresponding action, the environment model 12 predicts the next state and any number of signals from the environment. In the example of FIG. 1, the environment model is a neural network which receives as input the actual observation $o_t$ or imagined observation $ô_t$ (or optionally a history of observations, which may include observation $o_t$ or $ô_t$, and observation(s) from one or more preceding times) and a corresponding action $a_t$ generated by the policy module 11, and predicts the next observation $ô_{t+1}$, and optionally also the next reward $\hat{r}_{t+1}$.

Figure 2:
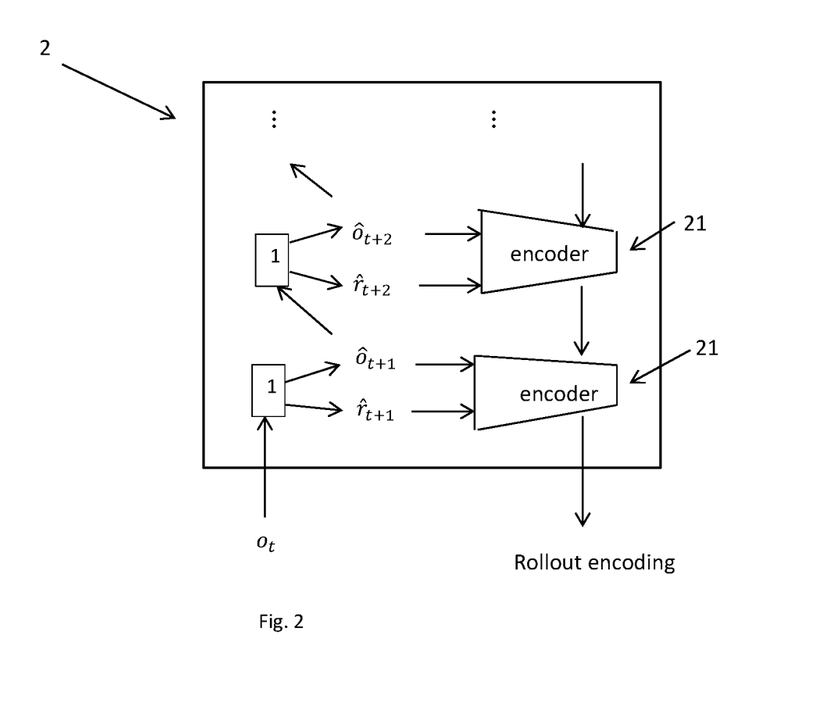
FIG. 2 shows a prediction-and-encoding unit for the neural network system.

Turning to FIG. 2, a prediction-and-encoding unit 2 is illustrated which uses the IC 1. The notation in FIGS. 2-4 is different from FIG. 1 in that t is used to designate a "current" time, at which the IC 1 is used by the prediction-and-encoding unit. It is assumed in this example that the IC 1 is of the form which outputs both the next observation $ô_{t+1}$ and the next reward $\hat{r}_{t+1}$.

To generate a trajectory, a current (actual) observation $o_t$ is input to the unit 2, and input into the IC 1, to generate $ô_{t+1}$, and $\hat{r}_{t+1}$. The prediction $ô_{t+1}$ is then input into the IC 1 again, to generate $ô_{t+2}$, and $\hat{r}_{t+2}$. This process is carried out in total r times, to produce a rollout trajectory of τ rollout time-steps. Thus, FIG. 2 shows how the environment model 12 of the IC 1 is used to obtain predictions for multiple time steps into the future, by initializing the rollout with the current actual observation, and subsequently feeding simulated observations into the IC 1, to iteratively create a rollout trajectory $\mathcal{T}$. The trajectory $\mathcal{T}$ is a sequence of features ($f_{t+1}, \ldots, f_{t+\tau}$), where for any integer i, $f_{t+i}$, denotes the output of the environment model 12 at the i-th step. That is $f_{t+i}$ comprises $ô_{t+i}$, and, in the case that the environment model 12 outputs also reward values, comprises both $ô_{t+i}$ and $\hat{r}_{t+i}$.

As explained below, the environment model 12 is formed by training, so it cannot be assumed to be perfect. It might sometimes make erroneous or even nonsensical predictions. For that reason, it is preferred not to rely entirely on the output of the environment model 12. For that reason, the prediction-and-encoding unit includes a rollout encoder 21. The rollout encoder 21 is an adaptive system (e.g. in the form of set of sequential state generation neural networks) which is trained to receive the trajectory, and "encode" it into one or more values referred to as a "rollout embedding". That is, the encoding interprets the trajectory, i.e. extracts any information useful for the agent's decision. The encoding may include ignoring the trajectory when necessary, e.g. because the rollout encoder 21 is trained to generate an output which has a low (or zero) dependence on the trajectory if the input to the rollout encoder 21 is a trajectory which is likely to be erroneous of nonsensical. The rollout embedding produced by the rollout encoder 21 can be denoted $e = \varepsilon(\mathcal{T})$, and can be considered a summary of the trajectory produced by the rollout encoder 21.

As shown in FIG. 2, the rollout encoder 21 can be applied to the trajectory $\mathcal{T}$ in τ iterations. In the first iteration, the rollout encoder 21 is applied to $f_{t+\tau}$ (i.e. the feature for the last the series of time steps). In each subsequent iteration, the rollout encoder 21 receives the output of the rollout encoder 21 from the preceding iteration and the feature of the preceding time step.

Figure 3:
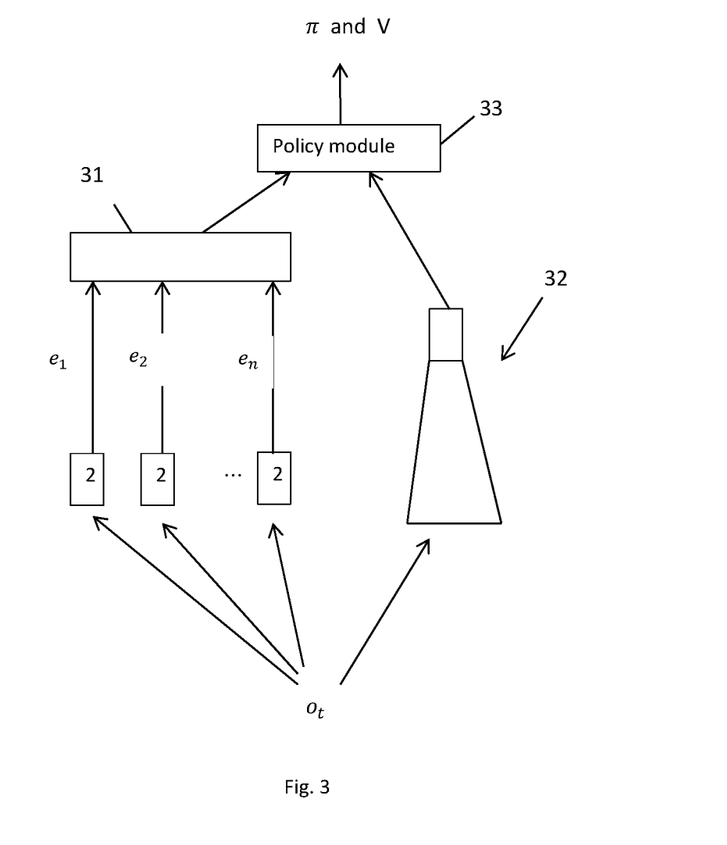
FIG. 3 shows the structure of the neural network system.

Turning to FIG. 3, the neural network system which employs one or more of the prediction-and-encoding units 2 is illustrated. The neural network system receives a current actual observation $o_t$. From it, the prediction-and-encoding unit 2 is employed n times, or multiple prediction-and-encoding units 2 (for example, n prediction-and-encoding units, which may be identical) are employed in parallel, to generate n separate trajectories $\mathcal{T}_1, \ldots, \mathcal{T}_n$. The rollout encoder 21 of the (or each) prediction-and-encoding unit 2 encodes each trajectory $\mathcal{T}_j$ (for j an integer in the range 1 to n) to produce a respective rollout embedding $e_j = \varepsilon(\mathcal{T}_j)$.

The n encoded values are input to an aggregator 31. The aggregator 31 converts the n rollout embeddings into a single vector referred to as an imagination code $c_{ia} = A(e_1, \ldots, e_n)$. In one example, the aggregator may simply concatenate the rollout embeddings.

The neural network system preferably also includes a model-free network 32 (such as a reinforcement learning neural network module which does not comprise a model of the environment). The model-free network 32 may be of any conventional form (in our experiments we chose a standard network of convolutional layers plus one fully connected layer). Typically the model-free network 32 is a neural network which receives the current (actual) observation $o_t$, and generates from it an output $c_{mf}$.

The neural network also includes a policy module (reinforcement learning output stage) 33, which may be another neural network. The policy module 33 receives the imagination code $c_{ia}$ and the output $c_{mf}$ of the model-free network 32. The policy model 33 outputs a policy vector π ("action policy") and an estimated value V. The policy vector π may be a vector characterizing the parameters of a network which uses the current (actual) observation $o_t$ to generate an action $a_t$ and V is value baseline data for the current observation, for determining an advantage of an action defined by the action policy. The neural network system shown in FIG. 3 can be considered as augmenting a model free agent (an agent controlled by a model-free network such as the model-free network 32) by providing additional information from model-based planning. Thus, the neural network system can be considered as an agent with strictly more expressive power than the underlying model-free agent 32.

Figure 4:
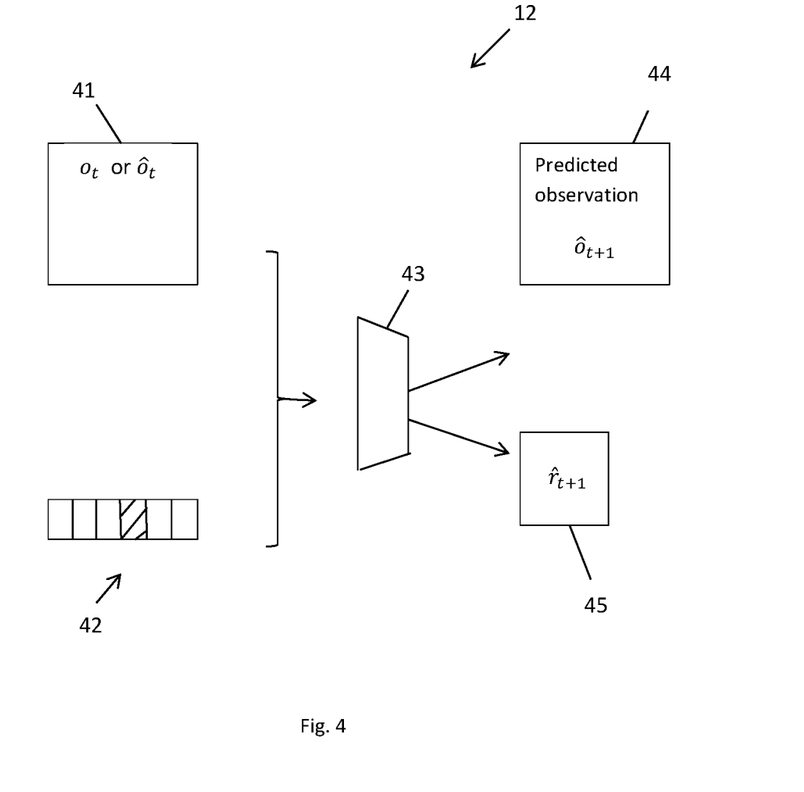
FIG. 4 shows a possible structure of an environment model used in the imagination core of FIG. 1.

FIG. 4 represents a possible structure of the environment model 12 of FIG. 1. A first input to the environment model is the current (actual or imagined) observation $o_t$ or $\hat{o}_t$. In FIG. 4 this is illustrated as a rectangle 41, since it may, for certain embodiments, take the form of a respective value for each of a set of points (pixels) in a two-dimensional array. In another case, the current observation may include multiple values for each pixel, so that it may correspond to multiple two-dimensional arrays. A second input to the environmental model 12 is an action $a_t$. This may be provided in the form of a vector 42, which has a number of components equal to the number of possible actions. The component corresponding to the action $a_t$ takes a predefined value (e.g. 1), and the other components take other value(s) (e.g. zero).

The two inputs to the environment model are combined (e.g. concatenated) to form structured content. The structured content is input to a convolutional network 43, e.g. comprising one or more convolutional layers. The output of the convolutional network 43 is the predicted observation $\hat{o}_{t+1}$. This is denoted as a two-dimensional array 44, since it may take the form of a pixel-wise probability distribution for an image. A second (optional) output of the convolution network 43 is a predicted reward $\hat{r}_{t+1}$ which is output as a data structure 45.

Figure 5:
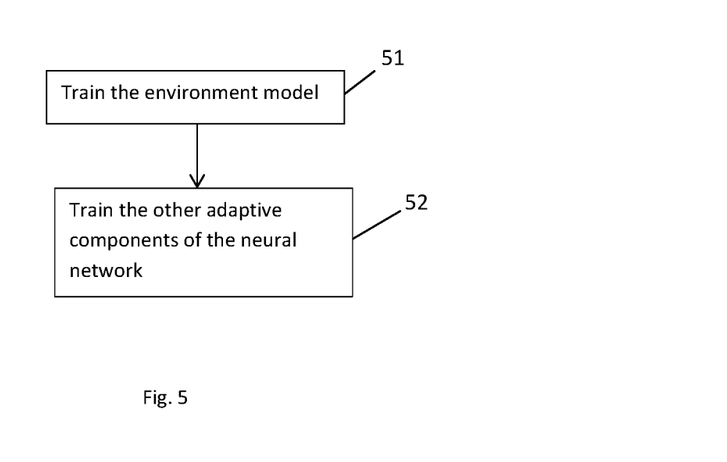
FIG. 5 shows a method of producing the neural network system.

We now turn to a description of the training procedure for the neural network, as illustrated in FIG. 5. It includes a first step 51 of training the environment model 12. In a second step 52, the other adaptive components of the network are trained concurrently using a cost function.

As mentioned above, the policy module 11 may also be trained in step 52, rather than being pre-set. It was found that it was valuable to train it by "distilling" information from the output of the policy module 33. Specifically, in step 52 a (small) model-free network (which can be denoted as performing the function $\hat{\pi}=(o_t)$) was generated, and then the cost function used in step 52 is augmented by including a cross entropy auxiliary loss between the imagination-augmented policy $\pi=(o_t)$ produced by the policy module 33 for the current observation $o_t$, and the policy $\hat{\pi}=(o_t)$ for the same observation. The existence of this term means that the policy module 11 will be trained such that the IC 1 tends to produce a rollout trajectory which is similar to the actual trajectories of the agent (i.e. the trajectory of the agent controlled by the neural network system of FIG. 3) in the real environment. It also tends to ensure that the rollout corresponds to trajectories with a relatively high reward. At the same time, the imperfect approximation between the policies results in the rollout policy having a higher entropy, thus striking a balance between exploration and exploitation.

Note that in a variant, the environment model 12 may be trained jointly with the other adaptive components by omitting step 51 and adding to the cost function used in step 52 an auxiliary loss term. In our experiments, however, we found that pre-training the environment model, as in FIG. 5, led to faster runtime of the training procedure.

The training data for step 51 may optionally be generated from trajectories of a partially-trained standard model-free agent (e.g. with the same form as the network 32) interacting with the environment. Using such trajectories is superior to generating training data from the interaction of a random agent with the environment, because random agents in non-trivial environments typically produce very low rewards.

Figure 6:
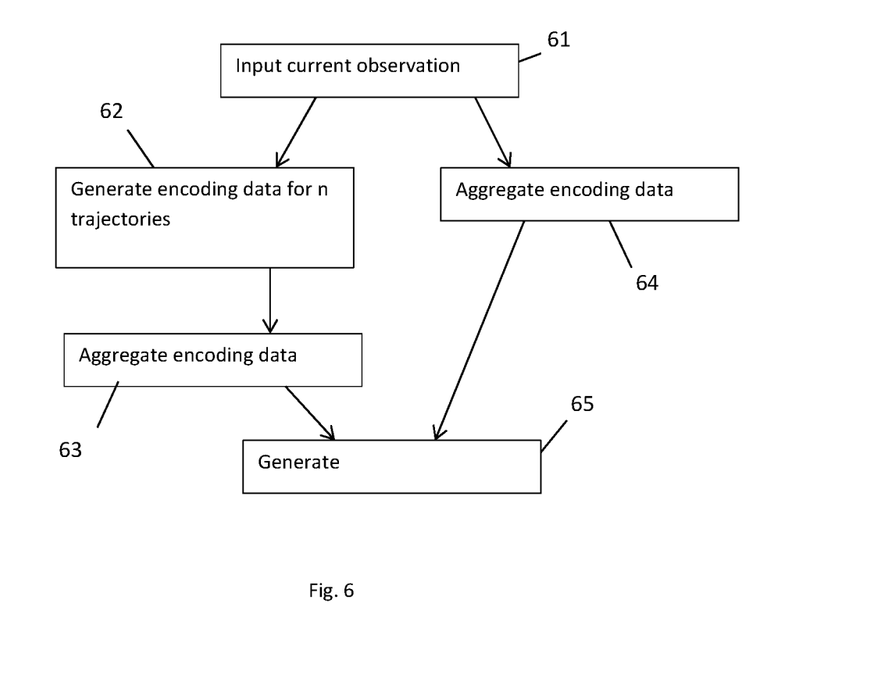
FIG. 6 shows an operation method of the neural network system.

The operation of the neural network is illustrated in FIG. 6. In a first step 61 the current (actual) observation $o_t$ is input (step 61). In step 62, the prediction-and-encoding unit(s) 2 are used to generate encoding data (rollout embeddings) for n trajectories based on the current observation. In step 63, this data is aggregated (e.g. concatenated). In parallel with (e.g. concurrently with) steps 62 and 63, in step 64 the model-free network 32 operates on the current observation. In step 65, the policy module 33 receives the output of the aggregator 31 and the model-free network 32, and generates its outputs.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input.

An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for controlling an agent interacting with an environment by using reinforcement learning performed on neural networks to perform a task in an attempt to achieve a specified result, the method comprising:

receiving a current observation characterizing a current state of the environment at a current time step;

generating, from the current observation, and using a model of the environment, trajectory data in response to the current observation, the trajectory data defining one or more trajectories, each trajectory comprising a respective predicted observation at each of a plurality of future time steps that are after the current time step, the respective predicted observation at each of the plurality of future time steps characterizing a predicted state of the environment at the future time step generating, from the trajectory data a respective rollout embedding for each of the one or more trajectories that represents a summary of the trajectory;

generating, from data derived from the respective rollout embeddings and based on reinforcement learning performed on neural networks, action policy data that defines an action policy for controlling the agent in response to the current observation; and selecting, using the action policy, an action to be performed by the agent in response to the current observation.

2. A method as claimed in claim 1, wherein the one or more trajectories include a plurality of trajectories, and wherein the method further comprises: aggregating the respective rollout embeddings for the plurality of trajectories into an imagination code; and wherein generating the action policy data comprises generating the action policy data dependent upon the imagination code.

3. A method as claimed in claim 1, further comprising:
processing the current observation using a model-free reinforcement learning neural network to generate a model-free output, wherein the model-free reinforcement learning neural network does not comprise a model of the environment, and wherein:

generating the action policy data comprises generating the action policy data from the data derived from the respective rollout embeddings and the model-free output.

4. A method as claimed in claim 1 wherein the model of the environment is a neural environment model that is configured to receive an input comprising an input observation or a history of observations, and a current action and to predict at least a subsequent observation in response; and wherein generating the trajectory data comprises, for each of the future time steps:

selecting, using a policy module, an action for a preceding time step, generating an input for the future time step from the action for the preceding time step and an observation at the preceding time step, and generating, using the neural environment model, a predicted observation for the future time step.

5. A method as claimed in claim 1 wherein the trajectory data further comprises, for each of the future time steps, one or more of: a predicted action, a predicted reward, or a predicted sequence termination signal.

6. A method as claimed in claim 1 wherein the policy data defines a policy vector defining the action policy and value baseline data for the current observation for determining an advantage of an action defined by the action policy.

7. A method as claimed in claim 1 wherein generating the respective rollout embeddings comprises processing the trajectory data using a sequential state generation neural network.

8. A method as claimed in claim 1 wherein the model of the environment is a learned model of the environment.

9. One or more non-transitory computer-readable storage media storing instructions that when executed by one or more computers cause the one or more computers to perform operations for controlling an agent interacting with an environment using reinforcement learning performed on neural networks to perform a task in an attempt to achieve a specified result, the operations comprising:

receiving a current observation characterizing a current state of the environment at a current time step;

generating, from the current observation, and using a model of the environment, trajectory data in response to the current observation, the trajectory data defining one or more trajectories, each trajectory comprising a respective predicted observation at each of a plurality of future time steps that are after the current time step, the respective predicted observation at each of the plurality of future time steps characterizing a predicted state of the environment at the future time step;

generating, from the trajectory data, a respective rollout embedding for each of the one or more trajectories that represents a summary of the trajectory;

generating, from data derived from the respective rollout embeddings based on reinforcement learning performed on neural networks, action policy data that defines an action policy for controlling the agent in response to the current observation; and selecting, using the action policy, an action to be performed by the agent in response to the current observation.

10. A system comprising one or more computers and one or more storage devices storing instructions that when executed by the one or more computers cause the one or more computers to use reinforcement learning performed on neural networks to perform operations for controlling an agent interacting with an environment, the operations comprising:

receiving a current observation characterizing a current state of the environment at a current time step;

generating, from the current observation, and using a model of the environment, trajectory data in response to the current observation, the trajectory data defining one or more trajectories, each trajectory comprising a respective predicted observation at each of a plurality of future time steps that are after the current time step, the respective predicted observation at each of the plurality of future time steps characterizing a predicted state of the environment at the future time step;

generating, from the trajectory data, a respective rollout embedding for each of the one or more trajectories that represents a summary of the trajectory;

generating, from data derived from the respective rollout embeddings and based on reinforcement learning performed on neural networks, action policy data that defines an action policy for controlling the agent in response to the current observation; and selecting, using the action policy, an action to be performed by the agent in response to the current observation.

11. A system as claimed in claim 10, wherein the one or more trajectories include a plurality of trajectories, and wherein the operations further comprise:

aggregating the respective rollout embeddings for the plurality of trajectories into an imagination code; and wherein generating the action policy data comprises generating the action policy data dependent upon the imagination code.

12. A system as claimed in claim 10, the operations further comprising:

processing the current observation using a model-free reinforcement learning neural network to generate a model-free output, wherein the model-free reinforcement learning neural network does not comprise a model of the environment, and wherein:

generating the action policy data comprises generating the action policy data from the data derived from the respective rollout embeddings and the model-free output.

13. A system as claimed in claim 10, wherein the model of the environment is a neural environment model that is configured to receive an input comprising an input observation or a history of observations and a current action and to predict at least a subsequent observation in response to the input; and wherein generating the trajectory data comprises, for each of the future time steps:

selecting, using a policy module, an action for a preceding time step, generating an input for the future time step from at least the action for the preceding time step and an observation at the preceding time step, and generating, using the neural environment model, a predicted observation for the future time step.

14. A system as claimed in claim 10 wherein the trajectory data further comprises, for each of the future time steps, one or more of: a predicted action, a predicted reward, or a predicted sequence termination signal.

15. A system as claimed in claim 10 wherein the policy data defines a policy vector defining the action policy and value baseline data for the current observation for determining an advantage of an action defined by the action policy.

16. A system as claimed in claim 10 wherein generating the respective rollout embeddings comprises processing the trajectory data using a sequential state generation neural network.

17. A system as claimed in claim 10 wherein the model of the environment is a learned model of the environment.

* * * * *